(12) United States Patent
Putrello, Jr.

(10) Patent No.: US 9,404,653 B1
(45) Date of Patent: Aug. 2, 2016

(54) TINDER STORAGE CONTAINER SOLAR POWERED FIRE STARTER

(71) Applicant: Andrew Carmen Putrello, Jr., Utica, NY (US)

(72) Inventor: Andrew Carmen Putrello, Jr., Utica, NY (US)

( * ) Notice: Subject to any disclaimer, the term of this patent is extended or adjusted under 35 U.S.C. 154(b) by 554 days.

(21) Appl. No.: 13/986,588

(22) Filed: May 16, 2013

(51) Int. Cl.
*F23Q 13/00* (2006.01)
*F24J 2/02* (2006.01)
*F24J 2/12* (2006.01)

(52) U.S. Cl.
CPC ............. *F23Q 13/005* (2013.01); *F24J 2/02* (2013.01); *F24J 2/12* (2013.01)

(58) Field of Classification Search
CPC .............. F24J 2/02; F24J 2/12; F24J 2/42; F23Q 13/005; A24F 15/10
See application file for complete search history.

(56) References Cited

U.S. PATENT DOCUMENTS

| | | | | |
|---|---|---|---|---|
| 3,025,851 A * | 3/1962 | Steinberg | ............. | F24J 2/02 126/680 |
| 3,236,227 A * | 2/1966 | Steinberg | ............. | F24J 2/02 126/612 |
| 3,613,659 A * | 10/1971 | Phillips | ............. | F24J 2/02 126/573 |
| 4,446,854 A * | 5/1984 | Clevett | ............. | F24J 2/02 126/682 |
| 5,927,272 A * | 7/1999 | Robertson | ............. | F23Q 13/005 126/699 |
| 2003/0020667 A1 * | 1/2003 | Essig, Jr. | ............. | E04H 15/20 343/832 |
| 2006/0054172 A1 * | 3/2006 | Ucci | ............. | F23Q 13/005 131/234 |
| 2007/0169783 A1 * | 7/2007 | Santos | ............. | A24F 47/00 131/240.1 |
| 2010/0139648 A1 * | 6/2010 | Bourke | ............. | F24J 2/0023 126/681 |
| 2013/0019916 A1 * | 1/2013 | Frank | ............. | F24J 2/42 136/206 |
| 2013/0022727 A1 * | 1/2013 | Sherwin | ............. | A23L 1/0128 426/523 |

FOREIGN PATENT DOCUMENTS

| | | | | |
|---|---|---|---|---|
| CH | 611997 A5 * | 6/1979 | ............. | F23Q 13/005 |
| CH | 634906 A5 * | 2/1983 | ............. | F23Q 13/005 |
| DE | 560633 C  * | 10/1932 | ............. | A24F 15/18 |
| FR | 2386780 A1 * | 11/1978 | ............. | F23Q 13/005 |

* cited by examiner

*Primary Examiner* — Christopher Harmon

(57) ABSTRACT

A tinder storage container solar powered fire starter that includes top and lower housings that when coupled together form a water tight tinder storage cavity of which the inside bottom surface is a machined parabolic reflector that when used in conjunction with a tinder holder arm that securely positions the fire starting tinder at the exact focus of the reflective parabolic surface of the lower housing is able to use solar power to ignite combustible materials. The tinder holder arm is stowed in the top housing during non-use and incorporates a series of light through holes, and flex points, that provide maximum efficiency and quick positioning from stow configuration to fire starting configuration. The inside reflective inside surface of the top housing is a signal mirror, a lanyard hole is provided to prevent loss. An hour glass shaped air escape slot provides easy coupling of the top and bottom housings.

5 Claims, 4 Drawing Sheets

TINDER STORAGE CONTAINER SOLAR POWERED FIRE STARTER

FIELD OF THE INVENTION

The present invention relates to a water proof tinder storage container and, more particularly, to a water proof tinder storage container that uses solar power to ignite fire starting tinder positioned on a tinder holder arm.

BACKGROUND OF THE INVENTION

Tinder storage containers and fire starters have been used in many different environments and can be particularly useful during survival situations, camping, and other outdoors activities where people are often isolated from civilization and the conveniences often found in populated environments. Tinder containers, and more particular, water proof tinder containers, are small pocket sized containers that allow the user to store and carry small amounts of dry fire starting tinder in one's pocket or backpack. The stored dry fire starting tinder can be used to start a seed fire that can then be used to ignite larger more difficult fire starting materials often found in the wilderness or other environments. Tinder containers are very useful in survival situations where many times wild tinder is damp or wet from rain, fog, or dew, and cannot be easily ignited. In addition, many outdoors activities take place in and around bodies of water and a water proof portable tinder container protects the dry fire starting tinder from becoming wet if the user should accidentally fall in a body of water. Generally speaking tinder containers of all types are simply water proof containers made from metal or plastic that often include an o-ring seal and are able to keep fire starting tinder dry in wet or damp environments. Tinder containers are often used along side stand-alone fire starters that are also very useful during survival situations, camping, and other outdoors activities. Fire starters can be used to provide warmth, cook meals, and also to signal rescue personnel. Fire starters on the market today use a variety of ignition sources that include, matches, lighters (that use some type of combustible liquid or gas), electrically heated elements, or pyrophoric elements, such as ferrocerium rods that are struck with sharp objects to produce a plurality of sparks. Matches, including water proof matches, do not work well in windy conditions, and provide minimum ignition time. Lighters use pyrophoric elements to ignite the on-board fuel source. Both lighters, and stand-alone pyrophoric type fire starters, all include elements that wear out over time, are susceptible to rapid oxidation in wet environments, are brittle and easily broken, require some means to scrape the pyrophoric element to obtain sparks, can be difficult to use, and contain rare earth elements, such as cerium that are becoming too expensive to be practical. Fire starters that use electrically heated elements require batteries or other electrical sources that wear out and must be replaced or recharged. There are also fire starters that include a tinder storage container portion of the device, but again, the fire starting elements within these devices all use consumable, replaceable, or rechargeable fire ignition systems. Both tinder containers and fire starters can also be life saving devices in a survival situation caused by natural disasters such as hurricanes, tornadoes, and floods. Often times in such natural disasters electrical service is lost and people must leave their homes and fend for themselves. Having dry fire starting tinder in a water proof tinder container and a fire starter to start the dry tinder could save or improve the quality of lives. Ever since tinder containers and fire starters have been used there has been a need for one invention that would provide sufficient water proof space to store enough dry fire starting tinder to start a seed fire, be small enough to carry in one's pocket, and would provide a non-consumable, non-electrical fire starting element to be used to ignite combustible materials in one portable, safe, durable device. The present invention addresses the aforementioned problems by using a structural design that is aimed at minimizing the negative effects thus increasing the likelihood that the individual will carry the tinder container solar powered fire starter and realize its benefits.

SUMMARY OF THE INVENTION

In accordance with the present invention, there is provided . . . a tinder storage container solar powered fire starter that includes top and lower housings that when coupled together form a water tight tinder storage cavity of which the inside bottom surface is a machined parabolic reflector that when used in conjunction with a tinder holder arm that securely positions the fire starting tinder at the exact focus of the reflective parabolic surface of the lower housing is able to use solar power to ignite combustible materials. The tinder holder arm is stowed in the top housing during non-use and incorporates a series of light through holes, and flex points that provide maximum efficiency and quick positioning from stow configuration to fire starting configuration. The inside reflective surface of the top housing is a signal mirror and a lanyard hole is provided to prevent loss. An hour glass shaped air escape slot is also included to aid in the coupling of the top and bottom housings and aid during solar alignment.

It would be advantageous to provide a . . . water tight tinder storage container and solar powered fire starter in one device.

It would also be advantageous to provide a . . . tinder storage container solar powered fire starter that included a reflective parabolic surface as the bottom surface of the tinder storage cavity.

It would further be advantageous to provide a . . . tinder storage container solar powered fire starter that included a tinder holder arm that positioned the tinder at the exact focus of a reflective parabolic surface of the bottom housing.

It would also be advantageous to provide a . . . tinder storage container solar powered fire starter that included a tinder holder arm that could securely hold the tinder in place during use.

It would further be advantageous to provide . . . a tinder storage container solar powered fire starter that included a tinder arm with light through holes and flex points.

It would also be advantageous to provide . . . a tinder storage container solar powered fire starter that included a tinder arm that would allow quick a change of configurations.

It would further be advantageous to provide . . . a tinder storage container solar powered fire starter that included a fire starting element that is non-consumable.

It would also be advantageous to provide . . . a tinder storage container solar powered fire starter that included mounting connectors for a tinder holder arm in all configurations.

It further be advantageous to provide . . . a tinder storage container solar powered fire starter that included a signal mirror.

It would also be advantageous to provide . . . a tinder storage container solar powered fire starter that included a lanyard hole.

It would further be advantageous to provide . . . a tinder storage container solar powered fire starter that provided an hour glass air escape slot to aid in coupling.

It would also be advantageous to provide . . . a tinder storage container solar powered fire starter that is compact enough to carry on one's pocket.

It would further be advantageous to provide . . . a tinder storage container solar powered fire starter that included-a water proof o-ring seal.

It would also be advantageous to provide . . . a tinder storage container solar powered fire starter that included knurled outside surfaces.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
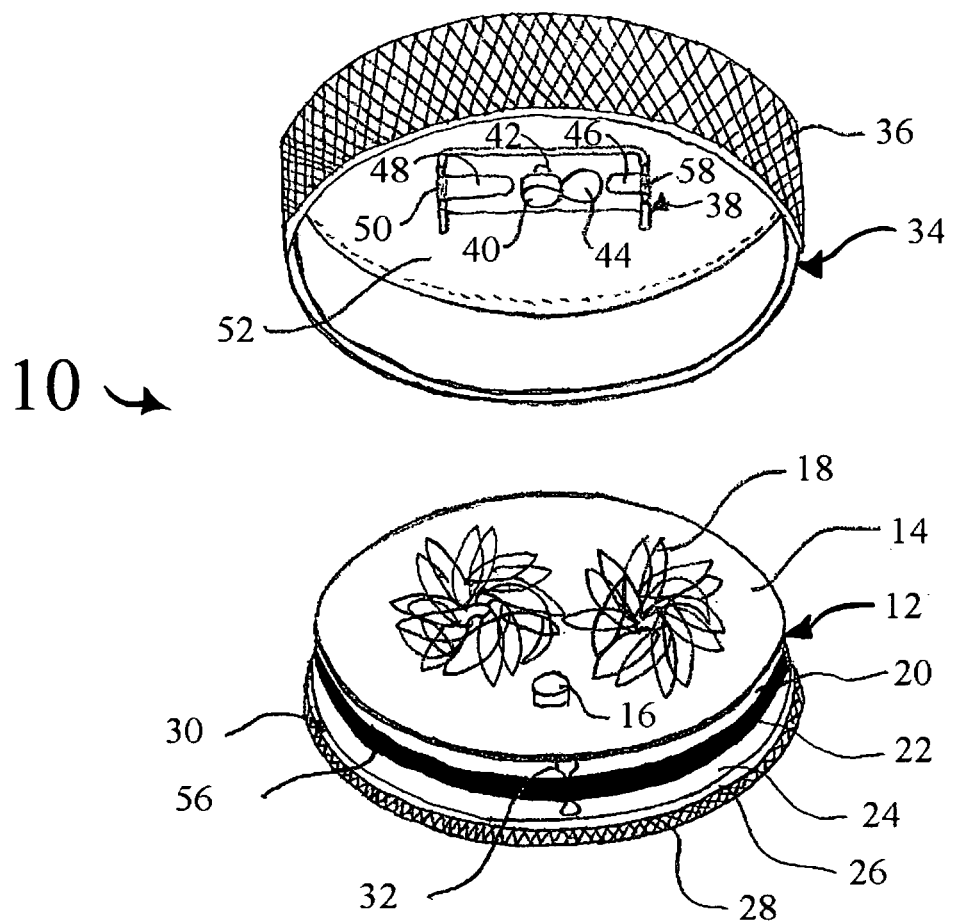
FIG. 1 is a perspective view of a tinder storage container solar powered fire starter with top housing removed and tinder holder arm in stowed configuration.

FIG. 1 is a perspective view of the tinder storage container solar powered fire starter 10 with top housing 34 removed and tinder holder arm 38 in stowed configuration.

Figure 2:
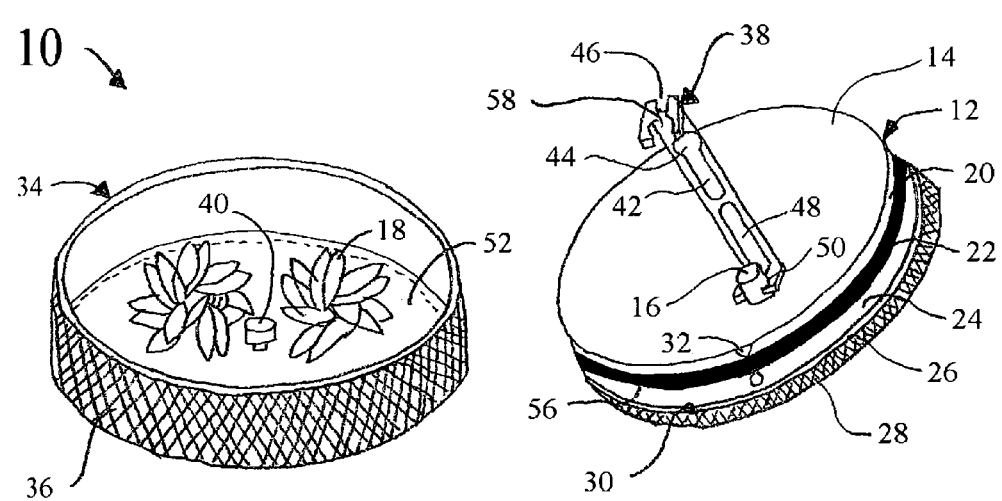
FIG. 2 is a left perspective view of a tinder storage container solar powered fire starter with top housing removed and tinder arm in fire starting configuration.

FIG. 2 is a left perspective tinder storage container solar powered fire starter 10 with top housing 34 removed and tinder arm in fire starting configuration.

Figure 3:
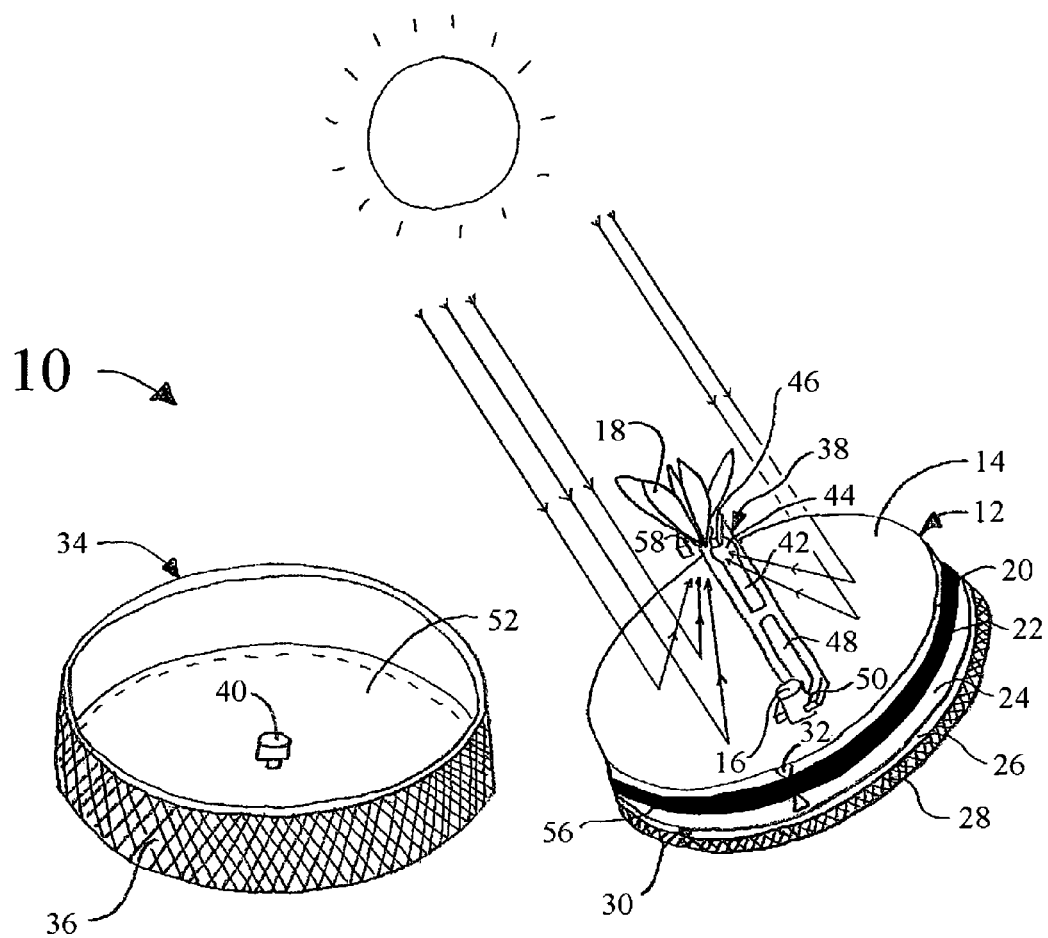
FIG. 3 is a perspective view of a tinder storage container solar powered fire starter in fire starting configuration with tinder held in position at the exact focus of the reflective parabolic surface of the lower housing using the tinder holder arm.

FIG. 3 is a perspective view of the tinder storage container solar powered fire starter 10 in fire starting configuration with tinder held in position at the exact focus of the reflective parabolic inside surface 14 of the lower housing using the tinder holder arm 38.

Figure 4:
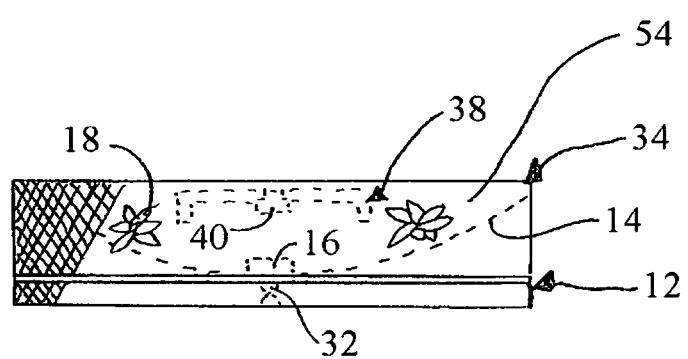
FIG. 4 is a front sectional view of a tinder storage container solo powered fire starter in stowed configuration showing stored tinder in place.

FIG. 4 is a front sectional view of the tinder storage container solar powered fire starter 10 in stowed configuration showing stored tinder in place.

Referring to FIGS. 1 to 4 each element of the tinder storage container solar powered fire starter 10 is briefly described. A full description of the function and operation of the tinder storage container solar powered fire starter 10 will follow. The tinder storage container solar powered fire starter 10 of the invention includes, a bottom housing 12 that includes a machined reflective parabolic inside surface 14, that also functions as the bottom inside surface of the tinder storage cavity 54. The bottom housing 12 also includes a tinder holder arm male connector 16, an o-ring channel 56 in which an o-ring seal 22 is exteriorly encircling the entire bottom housing 12. The bottom housing 12 also includes an air hour glass shaped air escape slot 32, a lanyard hole 30, and a knurled lower edge 28. The tinder storage container solar powered fire starter 10 of the invention also includes a top housing 34, that has a knurled outside edge 36 around the entire perimeter and can be removeably coupled to the bottom housing 12. The top housing 34 also includes a tinder holder arm male connector top 40, an inside flat reflective surface top 52 that also functions as the top inside surface of the tinder storage cavity 54. The tinder storage container solar powered fire starter 10 of the invention also includes a tinder holder arm 38, that includes, a female vertical position connector 50, a female horizontal position stow connector hole 44, a light through hole tinder wedge upper 46, light through hole flex point lower 48, and female connector slot 42.

In operation and referring to FIG. 4, the tinder storage container solar powered fire starter 10 is shown in the stowed configuration with the fire starting tinder 18 securely stowed in a water tight environment and the tinder holder arm 38 securely stowed in the top housing 34. Now referring to FIGS. 1 to 4, in the stowed configuration, the tinder holder arm 38 is securely stowed in the top housing 34 by aligning the tinder holder arm 38 female horizontal position stow connector hole 44 over the tinder holder arm male connector top 40 and then pressing down and sliding the tinder holder arm 38 away from the center of the top housing 34 allowing the female connector slot 42 to ride underneath the larger diameter top of the tinder holder arm male connector top 40 and along the lower smaller diameter of the tinder holder arm male connector top 40. This keeps the tinder holder arm 38 securely stowed in the optimum position during non-use. In operation, the tinder holder arm 38 must be removed from the stowed position and repositioned to the fire starting configuration. To remove the tinder holder arm 38 from the stowed position, the user simply slides the tinder holder arm 38 horizontally and towards the center of the top housing 34 using the female connector slot 42 until it stops. This aligns the female horizontal position stow connector hole 44 with the larger diameter top portion of the tinder holder arm male connector top 40 allowing the user to slide the tinder holder arm 38 straight up and over the tinder holder arm male connector top 40. Once the tinder holder arm 38 is removed from the stowed position, the user must reposition the tinder holder arm 38 in the fire starting configuration. This is accomplished by aligning the female vertical position connector 50 of the tinder holder arm 38 over the tinder holder arm male connector 16 found at the center bottom of the reflective parabolic inside surface 14 of the bottom housing 12. The user then simply presses straight down causing the female vertical position connector 50 of the tinder holder arm 38 to flex and expand via light through hole flex point lower 48 and slidably and securely connect the tinder holder arm 38 to the tinder holder arm male connector 16 of the center bottom of the reflective parabolic inside surface 14 of the bottom housing 12. The tinder storage container solar powered fire starter 10 is now in fire starting configuration as shown in FIG. 2 and FIG. 3. Once the tinder storage container solar powered fire starter 10 is in fire starting configuration, the tinder holder arm 38 allows the user to securely position the fire starting tinder 18 at the exact focus point of the reflective parabolic inside surface 14 of the bottom housing 12. In addition, the tinder holder arm 38 includes light through hole tinder wedge upper 46 and light through hole flex point lower 48 that minimize light interference once the tinder holder arm 38 is in position allowing maximum efficiency. The light through hole tinder wedge upper 46 and light through hole flex point lower 48 also allow flexing of the tinder holder arm 38 that aids in both changing configurations and holding fire starting tinder 18 in position. Now referring to FIG. 3, next the user securely wedges a small amount of fire starting tinder 18 into the tinder hole 58 of the tinder holder arm 38 of the tinder storage container solar powered fire starter 10. This is accomplished by first placing the fire starting tinder 18 into the tinder hole 58 and sliding it towards the light through hole tinder wedge upper 46. This causes the tinder holder arm 38 to expand via light through hole tinder wedge upper 46 thus wedging the fire starting tinder 18 in place. Now referring to FIG. 3, the user next aims the tinder storage container solar powered fire starter 10 bottom housing 12, towards the sun or any nearby star if one is on a space mission. Because the tinder holder arm 38 positions the fire starting tinder 18 at the exact focus of the reflective parabolic inside surface 14 of the tinder storage container solar powered fire starter 10 all photons from the sun striking the reflective parabolic inside surface 14 of the bottom housing 12 of the tinder storage container solar powered fire starter 10 are reflected to a singular focus point at the position of the tinder instantly resulting in extremely high temperatures that are capable of igniting the fire starting tinder 18. Any type of fire starting tinder 18 could be used with the present invention, wild or man-made. Once the base of the fire starting tinder 18 has been ignited to a burning ember the user grasps the yet unburned top portion of the fire starting tinder 18 and unwedges the fire starting tinder 18 from the tinder hole 58 and flexed light through hole tinder wedge upper 46 and then transfers the burning ember to a larger pile of fire starting tinder 18 placed within a fire pit or suitably prepared area. The inside flat reflective surface top 52 of the tinder storage container solar powered fire starter 10 also serves as a very effective signal mirror to be used to alert rescue personnel in times of emergency. The reflective parabolic inside surface 14 of the bottom housing 12 cannot be used for signaling purposes as all photons are focused to a singular point just above the bottom housing 12 not into space. When coupling the top housing 34 to the bottom housing 12 during non-use a water proof and air tight seal is formed between the top housing 34 and an o-ring seal 22 that is exteriorly encircling the entire bottom housing 12. Because of this air tight seal, it is necessary to provide a means for a small amount of air trapped during coupling to escape the inside of the storage cavity to prevent the air pocket from preventing the top housing 34 and bottom housing 12 from completely coupling. This is accomplished by the use of an hour glass shaped air escape slot 32 that is shallow at is lower center portion and allows enough air to escape during initial coupling of the top housing 34 and bottom housing 12 to prevent the formation of an air pocket. The o-ring is automatically sealed as the o-ring is pressed further into the lower narrowest shallow portion of the hour glass shaped air escape slot 32 as coupling is completed. The hour glass shaped air escape slot 32 also serves as an aid to aiming the tinder storage container solar powered fire starter 10 directly at the sun by allowing the user to track the shadowing that forms within the hour glass shaped air escape slot 32 when misaligned with the sun. The tinder storage container solar powered fire starter 10 also includes a lanyard hole 30 that allows the user to carry the tinder storage container solar powered fire starter 10 on their belt or secure to back packs or other equipment to prevent loss.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A tinder storage container solar powered fire starter for providing water proof tinder storage and igniting combustible materials using solar power, comprising:
    lower housing means for providing a lower surface of a tinder storage cavity that can be used to ignite combustible materials using only solar energy;
    upper housing means for providing an upper surface of the tinder cavity removably coupled to the lower housing means;
    a tinder holder arm configured to hold tinder and other combustible material at the exact focus of the reflective parabolic surface of the bottom housing;
    wherein the tinder holder arm is separately slidably connected to said upper housing to a horizontal stowing position during non-use and removably connected to said lower housing;
    means for providing a water tight junction between the bottom housing and top housing; and
    means for providing an air escape pathway to allow complete coupling of the top and bottom housings comprising an hour glass shaped slot in the lower housing.

2. The tinder storage container solar powered fire starter of claim 1 wherein the lower housing means is waterproof and comprises a tinder holder arm male connector; an o-ring channel; a lanyard hole; a knurled lower edge; and a non-consumable fire starting element.

3. The tinder storage container solar powered fire starter of claim 1 wherein the upper housing means is waterproof and comprises a tinder holder arm male connector; an inside flat reflective surface capable of use as a signal mirror; and a knurled outside edge.

4. The tinder storage container solar powered fire starter of claim 1 wherein the tinder holder arm is made from fire resistant material and comprises a tinder hole; a female vertical position connector; a female horizontal position stow connector; a light through hole tinder upper wedge; and a light through hole lower flex point.

5. The tinder storage container solar powered fire starter of claim 1, wherein said means for providing a water tight junction between the bottom housing and top housing comprises a rubber material, flexible o-ring seal.

* * * * *